O. PATRIQUIN.
AUTOMOBILE SKID CHAIN FASTENER.
APPLICATION FILED MAR. 1, 1919.

1,329,923.

Patented Feb. 3, 1920.

WITNESSES
C. Brau
A. L. Kitchin

INVENTOR
Oliver Patriquin
BY
ATTORNEYS

UNITED STATES PATENT OFFICE.

OLIVER PATRIQUIN, OF WALTHAM, MASSACHUSETTS.

AUTOMOBILE-SKID-CHAIN FASTENER.

1,329,923.   Specification of Letters Patent.   Patented Feb. 3, 1920.

Application filed March 1, 1919. Serial No. 280,049.

*To all whom it may concern:*

Be it known that I, OLIVER PATRIQUIN, a citizen of the United States, and a resident of Waltham, in the county of Middlesex and State of Massachusetts, have invented a new and Improved Automobile-Skid-Chain Fastener, of which the following is a full, clear, and exact description.

This invention relates to fastening devices for anti-skid chains, and has for an object the provision of an improved construction which may be connected to a chain substantially at any point and to the wheel of the automobile, for holding the chain against accidental removal.

Another object of the invention, more specifically is the provision of a clamping device arranged on the spoke of the wheel provided with means for receiving the ends rings or links of an anti-skid chain, whereby the accidental losing of the chain is prevented in case of breakage.

Figure 1:
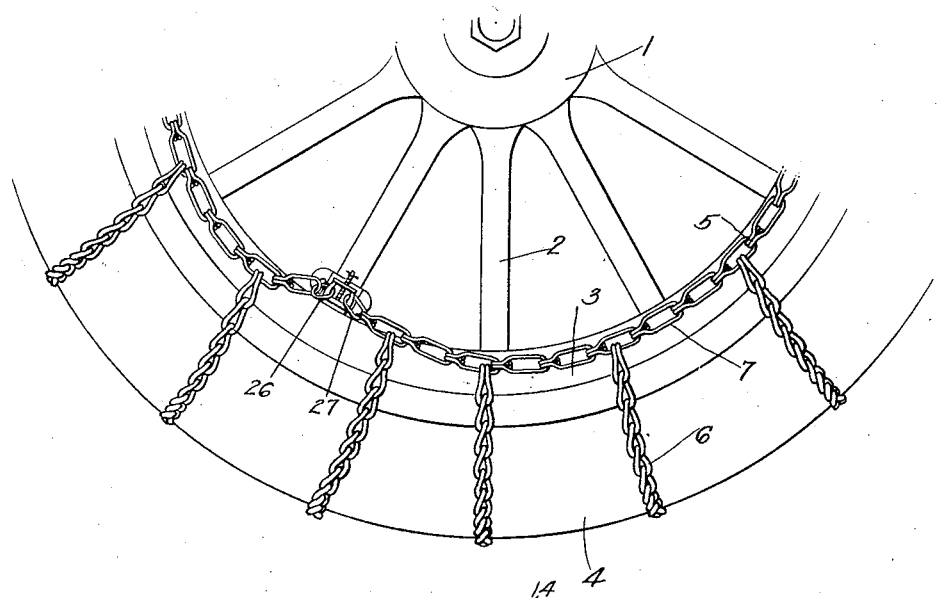
Figure 1 is a side view of part of a wheel with a tire thereon together with an anti-skid chain, an embodiment of the invention applied to the chain and the wheel.

Referring to the accompanying drawing by numerals, 1 indicates a wheel of any desired kind having spokes 2 and a rim or felly 3 to which the tire 4 is secured in any desired way. Associated with the wheel and tire is an anti-skid chain structure 5 provided with transverse chain members 6 and side elements 7. The structure just described is old and well known, and alone forms no part of the present invention. Chains of this kind operate successfully as long as they are in place, but sometimes through breakage, or through some reason the side elements 7 are disconnected so that the entire chain structure falls off the wheel. To prevent loss in this manner the fastener embodying the invention is connected with the chain and with the wheel so as to always maintain the chain in contact with the wheel, even though part of the same may become broken.

Figure 2:
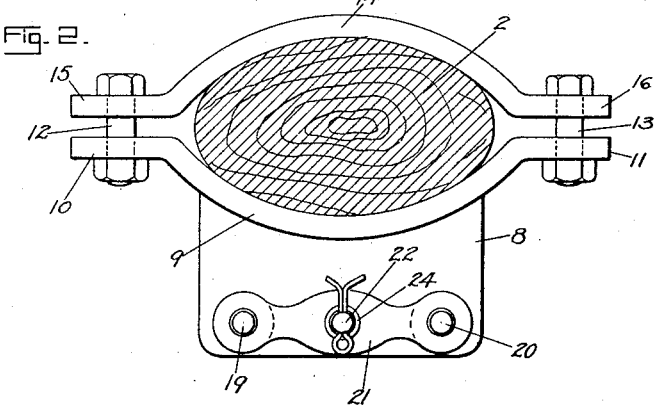
Fig. 2 is a top plan view of a fastener disclosing an embodiment of the invention, a spoke being shown in connection therewith.
Figure 3:
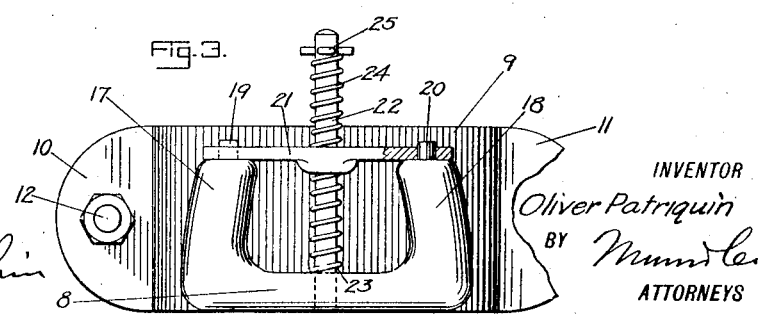
Fig. 3 is a front view of the fastener shown in Fig. 2.

The fastener embodying the invention is provided with a base member 8 substantially flat and provided with an arc-shaped clamping member 9 preferably formed integral therewith, said arc-shaped member having apertured extensions 10 and 11 accommodating the bolts 12 and 13. A coacting clamping plate 14 is provided which has apertured extensions 15 and 16 for accommodating the bolts 12 and 13. This arrangement presents a clamping structure for clamping one of the spokes 2 as indicated in Figs. 1 and 2. Arranged on the base 8 opposite the clamping member 9 are uprights or posts 17 and 18 which are preferably integral with base 8, said posts preferably merging into pins 19 and 20, though these pins if desired may be formed separate and secured in place. Pins 19 and 20 normally project through suitable apertures in opposite ends of the retaining bar 21 which has a central aperture whereby it may slide freely on the shaft 22 rigidly secured to base 8 between the posts 17 and 18. Springs 23 and 24 are arranged on opposite sides of the bar 21, there being a cotter-pin 25 for holding the spring 24 in place. These springs are under tension, the spring 24 slightly stronger than spring 23 so that the parts will remain normally in the position shown in Fig. 3. When the bar 21 has been moved upwardly against the action of spring 24 and then turned it will move downwardly a short distance below the pins 19 and 20, but not down to the base 8 whereby the links 26 and 27 of the chain may easily be placed in position on the posts 17 and 18 after which the bar 21 is placed again in position as shown in Fig. 3. If desired one fastener may be used as shown in Fig. 1 with a single chain, or any desired number of fastening structures may be used with one chain for each fastening structure. As shown in Fig. 1 the fastening structure is clamped to one spoke and the element 7 connected therewith which holds the transverse chain 6 in proper position.

What I claim is:

1. A fastening device for anti-skid chains, comprising a base, posts on the base adapted to engage a chain, a shaft on the base between the posts, a bar having a rotary mounting on the shaft, said bar having apertures in its ends, and pins on the posts adapted to enter the apertures in the bar.

2. A fastening device for anti-skid chains, comprising a base, posts on the base, a shaft between the posts, a bar having rotary mounting on the shaft, springs on the shaft on opposite sides of the bar, the spring between the bar and the base being weaker than the other spring, and interlocking means between the ends of the bar and posts.

3. A fastening device for anti-skid chains, comprising a base, posts on the base, a shaft on the base between the posts, a bar having central rotary mounting on the shaft and having apertures in its ends, pins on the posts adapted to enter the apertures in the bar, and springs on the shaft on opposite sides of the bar, the spring between the bar and the base being weaker than the other springs.

OLIVER PATRIQUIN.